July 13, 1937.  C. E. SORENSEN  2,086,644
INTERNAL COMBUSTION ENGINE OILING SYSTEM
Filed Nov. 17, 1933   2 Sheets-Sheet 2
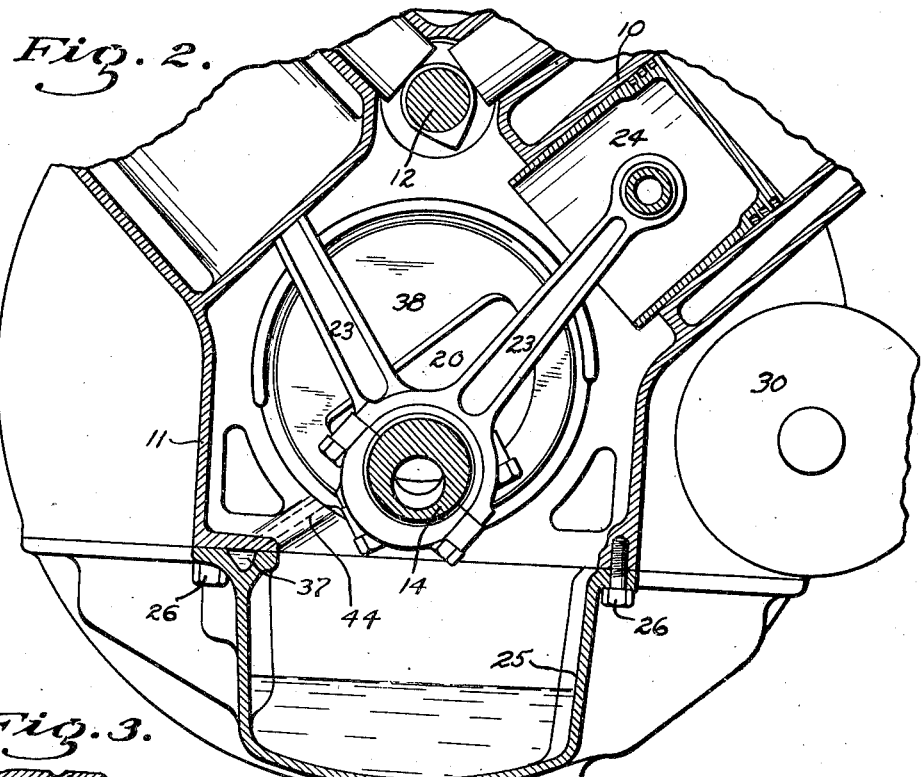
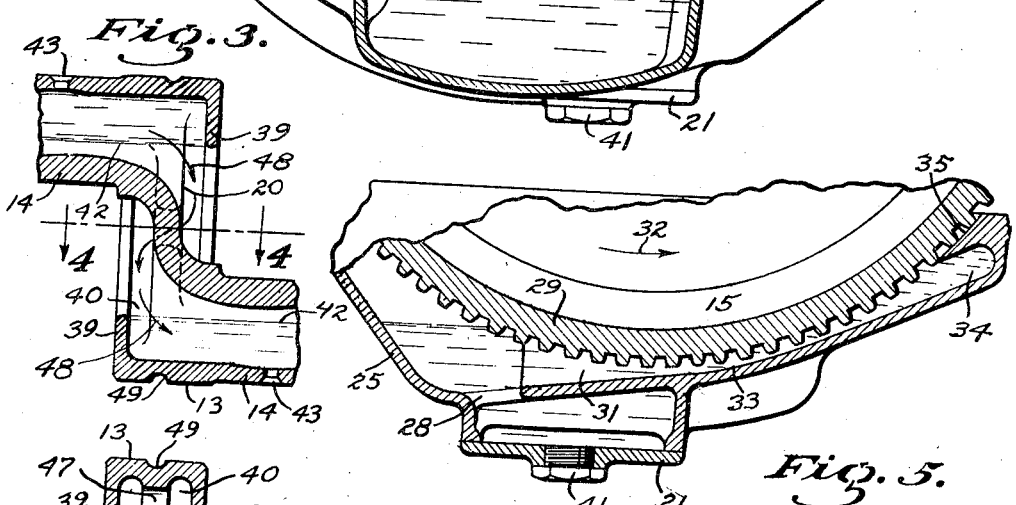
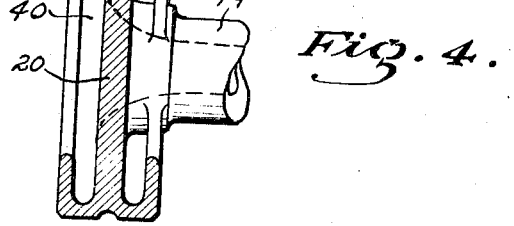
INVENTOR.
C. E. Sorensen.
BY
ATTORNEY.

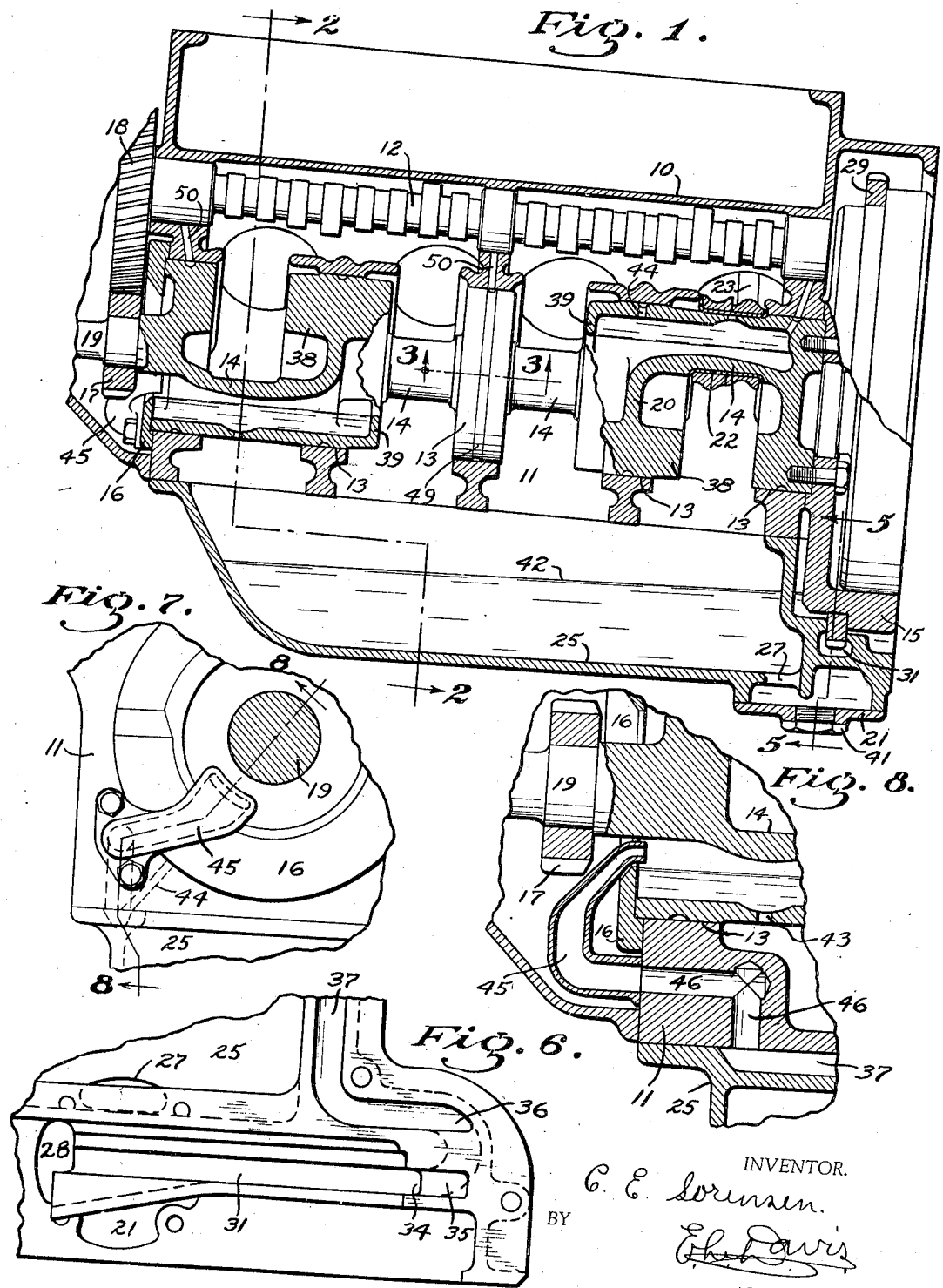

Patented July 13, 1937

2,086,644

UNITED STATES PATENT OFFICE 2,086,644

INTERNAL COMBUSTION ENGINE OILING SYSTEM

Charles E. Sorensen, Detroit, Mich., assignor to Ford Motor Company, Dearborn, Mich., a corporation of Delaware Application November 17, 1933, Serial No. 698,458

9 Claims. (Cl. 184—6)

The general object of my invention is to provide an internal combustion engine having an oiling system of simple, durable and inexpensive construction.

More particularly, the object of my invention is to provide an engine oiling system wherein lubricant is delivered under pressure to the crankshaft main bearings, the connecting rod bearings and to the camshaft bearings without, however, conducting such lubricant through pressure resisting conduits or oil lines. The high speed at which the modern automobile engine operates requires that the lubricant be fed under pressure to the several bearings therein and to accomplish this it has been customary to provide an oil pump as an accessory, conducting oil under pressure from the pump to the bearings by means of tubes or conduits. Such tubes, being under pressure, often become loose or break, so that the oil is lost if the break is outside the engine and at any rate upon failure of any part of the system the oil pressure at the bearings fails. It is to prevent such failure that I have provided my improved oiling system.

The general scheme employed comprises circulating oil from an oil sump to the forward end of the engine crankshaft by means of the engine flywheel and generating pressure in the oil, due to the centrifugal action of the crankshaft. The crankshaft itself is of novel design, it being constructed to function as a centrifugal pump whereby pressure is generated in the oil. The oil is then fed through ports in the crankshaft to the several bearings of the engine. As the pressure developed by a centrifugal pump increases as the square of the speed, just sufficient centrifugal effect is provided to generate the required pressure at the top speed of the engine. The engine shown herein has a top speed of about 5000 R. P. M. and at this speed a pressure of 60 lbs. per sq. in. is developed at the bearings. At slower speeds the pressure is correspondingly decreased.

The function of the flywheel in circulating the oil should not be considered the equivalent of an oil pump as very little pressure is generated thereby and because the only moving element is the flywheel itself which must operate at all times while the engine is running.

With these and other objects in view, my invention consists in the arrangement, construction and combination of the various parts of my improved device, as described in the specification, claimed in my claims, and illustrated in the accompanying drawings, in which:

Figure 1 shows a vertical, longitudinal, central sectional view through an 8 cylinder V-type motor having my improved oiling system incorporated therein.

Figure 2 shows a sectional view, taken on the line 2—2 of Figure 1.

Figure 3 shows a sectional view, taken on the line 3—3 of Figure 1.

Figure 4 shows a sectional view, taken on the line 4—4 of Figure 3.

Figure 5 shows a sectional view, taken on the line 5—5 of Figure 1.

Figure 6 shows a plan view of the rear portion of the engine oil pan, illustrating the oil circulating conduit therein.

Figure 7 shows a front view of the engine shown in Figure 1, illustrating the means for conducting oil from the oil pan conduit to a position within the arc described by the engine crank pins, and Figure 8 shows a sectional view, taken on the line 8—8 of Figure 7.

Referring to the accompanying drawings, I have used the reference numeral 10 to indicate the cylinder block casting of a V-type 8 cylinder engine, this casting being formed integrally with that portion 11 of the engine commonly called the crankcase. It will be noted that this engine is of the 90 degree type wherein two banks of four cylinders each are provided, and wherein a camshaft 12 is rotatably mounted in the space between the two banks of cylinders. Substantially aligned with the intersection of the axes of the two rows of cylinders, I rotatably mount the crankshaft of the engine. This crankshaft comprises five axially spaced cylindrical journals 13, these journals being cast integrally with crank pins 14, which are spaced at 90 degree intervals around the axis of the journals to thereby form a four-throw crankshaft. The journals 13 are of appreciable length, each being formed as a cylindrical ring around the periphery of a relatively thin disk 20.

A flywheel 15 is secured to the rearmost end of the crankshaft while the plate 16 is secured to the forward end of the shaft. The peripheries of the journals 13 are rotatably mounted in axially aligned cylindrical openings in the crank case 11, each of these openings being provided with babbitt-lined bearing sleeves. The crank case is so constructed that upon removal of the plate 16 the crankshaft may be removed end-wise out of the crankcase. The plate 16 not only serves as a thrust bearing but also assists in balancing the crankshaft. A shaft 19 is formed integrally with the forward end of the crankshaft upon which shaft a gear 17 is fixedly secured, which gear meshes with a larger gear 18 which is secured to the forward end of the camshaft 12. Thus, rotation of the crankshaft rotates the camshaft 12 at one-half engine speed, as in the conventional 4-cycle motor.

Each of the crank pins 14 is provided with a split bearing sleeve 22 which is rotatably mounted thereon and the large ends of a pair of connecting rods 23 are rotatably mounted on the periphery of each of these sleeves, the other or small ends of these connecting rods being fulcrumed in pistons 24 which are reciprocally mounted in the cylinder block 10 in the conventional manner.

It will be noted from Figures 1 and 2 that an oil pan 25 is secured over the bottom of the crankcase 11, this pan being held in place by a plurality of cap screws 26. This pan forms the oil reservoir or sump from which oil is conveyed to the several bearings. Referring to Figures 1, 5 and 6, the means for conveying oil from the oil pan to the forward end of the motor is shown. The flywheel 15 is provided with a starting ring gear 29 which meshes with a pinion associated with a starting motor 30 to crank the engine. While the ring gear 29 is primarily provided for the purpose of cranking the engine, it is also utilized herein for conveying the oil to the forward end of the engine. The rear end of the oil pan 26 is provided with a channel 31 formed therein which extends therearound through about 30 degrees of arc, through which channel the ring gear 29 rotates. It will be noted that the normal rotation of the engine is in the direction shown by arrow 32 and that the oil level in the oil pan is somewhat above the lower portion of the ring gear so that the portion of the ring gear which is enclosed by the channel 31 is emersed in oil. Consequently, normal rotation of the engine will tend to drag oil lengthwise through this channel. The entrance or leading end of the channel 31 is flared out, however the intermediate portion 33 of the channel quite closely fits the ring gear. Farther on in the direction of rotation, the bottom of the channel draws away from the ring gear to form a chamber 34, and still farther the end of the channel or cut off closely fits, at 35, the periphery of the ring gear.

During the normal rotation of the flywheel the spaces between the ring gear teeth convey the same amount of oil into the chamber 34 as they draw out past the cut off. However, a drag is produced on the oil in the intermediate area 33 which not only forces the oil between the ring gear teeth into the chamber 34 but also causes the oil in the restricted area 33 to likewise be forced into the chamber 34. The oil conducted into the chamber from this source cannot escape through the cut-off 35 and consequently a slight pressure is built up in the chamber 34. A duct 36 is cast in the oil pan 25, which duct reverses the oil flow from the chamber and leads up to the upper edge of the oil pan and connects with a groove 37 which is cast in said upper edge in position extending therealong to the forward end of the engine. When the oil pan 25 is bolted in place on the lower side of the crankcase 11, the crankcase and groove 37 form a closed conduit for conducting oil from the duct 36 to the forward end of the engine.

It should be kept in mind that the oil conveying system just described is not claimed to be a pressure system but comprises only a simple means for economically conveying a large amount of oil under a very low pressure. This oil circulator is not only much more economical to manufacture than any other type of oil pump known to the applicant, the ring gear being required to start the engine, but is also superior because of its unfailing operation.

Referring to Figures 5 and 6, means are provided for allowing sediment to settle out from the oil prior to its circulation by the ring gear. A relatively large opening is provided in the oil pan 25 just beneath the ring gear 29 over which a cover plate 21 is secured. Oil in the pan 25 proper must flow through an opening 27 in the bottom of the pan to enter the chamber closed by the plate 21. A second opening 28 is provided whereby the oil may enter the space just ahead of the channel 31.

Inasmuch as the rear wall of the oil pan otherwise separates the oil pan proper from the chamber in which the flywheel rotates, it is required that the oil follow the path just described when in circulation. A drain plug 41 is detachably threaded into the plate 21 to provide ready means for draining the oil from the engine.

The crankshaft of the engine will now be described.

Referring to Figures 3 and 4, it will be noted that a radial section through the periphery of each journal 13 may be described as being generally of a T section. However, suitable counterweights 38 are cast integrally with the shaft which extend axially beyond the edges of the journals, particularly the second and fourth journals. These weights are sector shaped and counterbalance the rotating forces of the two adjacent crank pins and associated connecting rods. That portion of each journal not occupied by a counterweight is provided with circular ribs 39, one on each side thereof, which extend inwardly therefrom. Thus, each journal of the shaft comprises a center web having a circular groove or channel, numbered 40, extending therearound on each side thereof, with the exception of that portion of the web which is occupied by the counterweights and crank pins.

The crank pins 14 are connected with the central webs as shown in Figure 3, from which it will also be seen that each of these pins is cast hollow and thereby connects the outer peripheral grooves 40 in each adjacent pair of journal disks. Oil may thus flow from one groove 40 through the central web, then through the connecting crank pin, then through the journal disk of the next journal and into the outer groove of this next journal. It is the purpose of this scheme to allow free passage of oil in this manner from one end of the shaft to the other, consequently, each central web 29 is provided with an opening 47 therethrough so that oil from the groove on one side of each disk may flow therethrough and enter the crank pin which connects with the next crankshaft journal disk. The passage of oil from one crank pin to the next is shown in Figure 3 by arrow 48.

From the foregoing it will be seen that oil deposited in the foremost groove of the front journal will eventually flow through each crank pin to the rearmost journal of the engine. It is, of course, apparent that a centrifugal level is established in each groove 40, as shown by line 42 in Figure 3, upon rotation of the shaft, and that the centrifugal pressure of such oil varies according to the speed of the engine.

In order to conduct the oil from the groove 37 to within the arc described by the crank pins, a tubular bracket 45 is fastened on the forward end of the motor, which bracket connects with the groove 37 by means of drilled passageways 46. The discharge end of the bracket 45 directs the flow of oil into the rotating shaft and as soon as the oil attains the velocity of the shaft centrifugal force tends to throw it outwardly with a much increased pressure. Each crank pin is provided with an oil hole 43 therein so that the crank pin bearings are adequately oiled. Oil holes 44 conduct oil from the openings in the crank pins to the bearings for the journals 13. These journals 13 are provided with annular oil grooves 49 and suitable ducts 50 are drilled in the cylinder block 10 which intersect these grooves thereby conducting oil under pressure to the camshaft bearings of the engine.

Among the many advantages arising from the use of my improved device, it may be well to mention that an exceedingly reliable oiling system is obtained. This increased reliability results because there are no exposed tubes and fittings in which oil under pressure is carried. The oil is circulated to the crankshaft while the pressure is developed at the bearings and not at a remote oil pump. Consequently, bursting of any oil conduit is almost an impossibility.

Some changes may be made in the arrangement, construction and combination of the various parts of my improved device without departing from the spirit of my invention, and it is my intention to cover by my claims, such changes as may reasonably be included within the scope thereof.

I claim as my invention:

1. A crank shaft comprising in part a plurality of main journals having a pair of eccentrically disposed crank pins therebetween, said shaft being characterized by its having a continuous passageway extending through said journals and crank pins, the passageway between said crank pins extending circumferentially around said shaft, the outer walls of said passageway being at all points spaced radially a substantially uniform distance from the axis of the shaft, and oil ducts in said shaft extending from each of said journals and from said crank pins to said passageway, for the purpose described.

2. A crank shaft, as claimed in claim 1, wherein said passageway comprises in part an internal groove in each of said main journals, which internal grooves are in communication with each other by means of an axial bore through said crank pin.

3. A crank shaft, as claimed in claim 1, wherein said passageway comprises in part an internal groove in each of said main journals, which grooves intersect an axial bore through said crank pin.

4. A crank shaft comprising at least three axially aligned main journals, the peripheries of which rotatably support the shaft, each of said journals being connected with its adjacent journal and within its peripheries by an eccentrically mounted hollow crank pin, a pair of internal grooves formed in the respective ends of the intermediate journal, one of said grooves communicating with the opening in one of said connecting crank pins while the other of said grooves communicates with the opening in the other of said connecting crank pins, said intermediate journal having an opening extending axially therethrough which forms a passageway between said grooves, the outer walls of said grooves and said grooves, the outer walls of said crank pins and said opening in openings in the crank pins and said opening in the intermediate journal all being spaced radially a substantially uniform distance from the axis of the shaft, whereby upon rotation of said shaft fluid supplied to the opening in one of said crank pins will flow by centrifugal force into its connecting internal groove and then through the opening in the intermediate journal and then into the other internal groove and then into the opening in the other connecting crank pin.

5. A crank shaft, as claimed in claim 4, wherein said intermediate journal comprises a disk having a cylindrical rim formed integrally therewith, said internal grooves being formed in said rim.

6. A device, as claimed in claim 4, wherein a plate is secured over the outer end of one of said end journals, said plate having an axial opening therethrough, and said plate forming one edge of the internal groove in said journal.

7. An internal combustion engine comprising, a crank shaft composed of a plurality of main journals each having a radial section therethrough of T-shaped form and each of said journals being connected together by hollow crank pins, a pair of oil receiving internal grooves formed in the respective ends of each journal, each of said grooves being connected respectively with the opening in the crank pin which projects from the opposite end of its journal, the central disk of each journal having an opening therethrough which connects the adjacent pair of internal grooves, and means associated with said engine for conducting oil at relatively low pressure to the internal groove in one of the end journals of the shaft.

8. A device, as claimed in claim 7, wherein the passageway formed by said internal grooves and hollow crank pins and disk openings is spaced a uniform distance from the axis of the shaft over its full length.

9. A device, as claimed in claim 7, wherein said means for conveying oil under low pressure comprises, a channel formed in the engine flywheel housing in which the engine flywheel dips as it rotates, said channel extending from the flywheel of said engine to a position adjacent to the forward end of the engine crank shaft.

CHAS. E. SORENSEN.